United States Patent [19]

Wagner et al.

[11] 4,103,705
[45] Aug. 1, 1978

[54] PRESSURE STABILIZER DEVICE

[75] Inventors: Walter D. Wagner, Chadds Ford, Pa.; Harold R. Gayle, Wilmington, Del.

[73] Assignee: Sun Oil Company of Pennsylvania, Philadelphia, Pa.

[21] Appl. No.: 800,669

[22] Filed: May 26, 1977

Related U.S. Application Data

[63] Continuation-in-part of Ser. No. 690,701, May 27, 1976, abandoned.

[51] Int. Cl.² ..................... B65D 51/16; F16K 15/08
[52] U.S. Cl. ............................. 137/544; 137/513.3; 137/513.5; 137/533.27; 220/203
[58] Field of Search ............... 137/513.3, 513.5, 544, 137/533.27; 220/203, 204

[56] References Cited

U.S. PATENT DOCUMENTS

| 1,654,474 | 12/1927 | Wolter | 220/203 |
| 1,930,568 | 10/1933 | Short | 137/513.5 X |
| 2,622,613 | 12/1952 | McNeal | 137/513.3 X |
| 3,561,472 | 2/1971 | Lamb | 137/533.27 X |
| 4,007,759 | 2/1977 | Martin | 137/513.5 X |

Primary Examiner—Robert G. Nilson
Attorney, Agent, or Firm—J. Edward Hess; Donald R. Johnson; Paul Lipsitz

[57] ABSTRACT

A pressure stabilizer device designed to be placed on the vent line of underground gasoline storage tanks in a service station. The pressure stabilizer is designed to allow inbreathing in the event a vacuum develops in the underground storage system or outbreathing in the event the pressure becomes too great. The stabilizer has an open aperture of a predetermined size to allow a given amount of inbreathing or outbreathing. The stabilizer also includes a gravity operated valve arrangement which opens in response to a given high pressure within the underground storage system to increase the aperture size of the stabilizer and allow a pressure release.

9 Claims, 4 Drawing Figures

U.S. Patent   Aug. 1, 1978   4,103,705
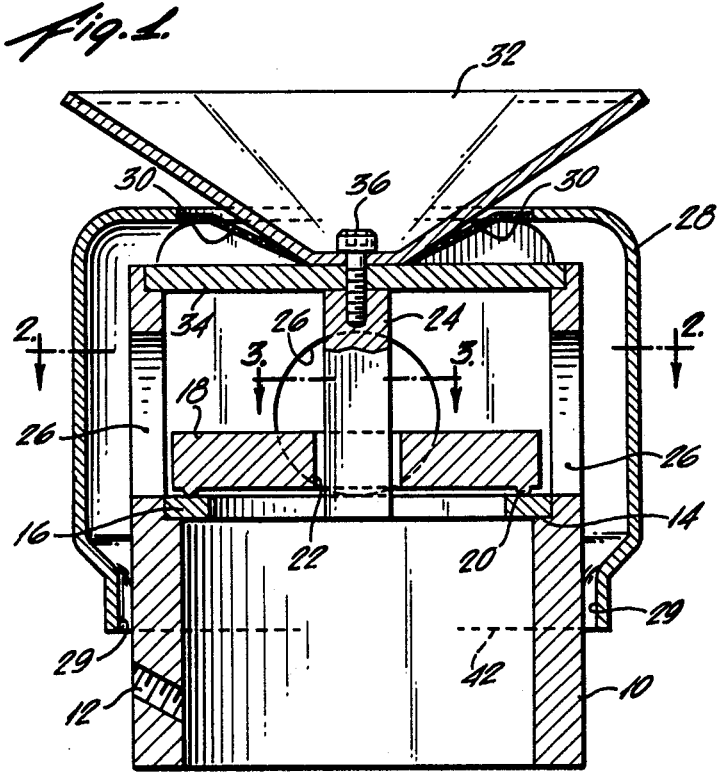
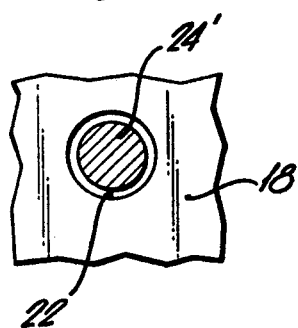
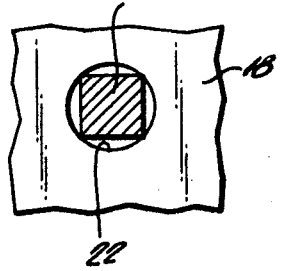
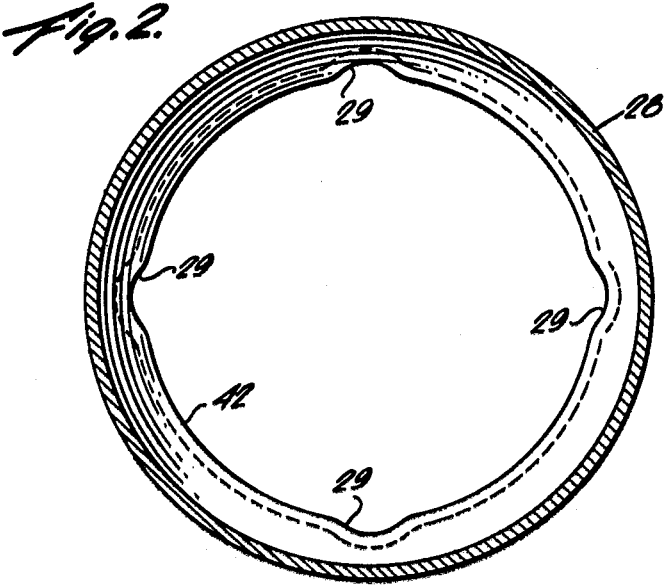

PRESSURE STABILIZER DEVICE

RELATED APPLICATIONS

This application is a continuation-in-part of Ser. No. 690,701, filed May 27, 1976, now abandoned.

BACKGROUND OF THE INVENTION

The present invention relates to a pressure relief valve designed for the vent line of a hydrocarbon storage facility.

It is current practice in the petroleum industry to have vent lines running from underground storage tanks in a service station to an above ground location so that pressurized vapors in the tanks may be released into the atmosphere. Also, when gasoline is being pumped from an underground tank, a vacuum normally develops and the vent line allows inbreathing of air into the tank. Recent Environmental Protection Agency (EPA) regulations have required the recovery of gasoline vapors previously vented to the atmosphere, and this has required a modification of the venting system. These environmental regulations will probably require a restrictive device on the end of a vent line to reduce the escape of hydrocarbon vapors into the air.

Several types of pressure/vacuum valves are currently available on the market to perform this function. Most of these devices employ springs to control the relief pressures. These valves are often unreliable because the spring forces tend to vary with age, weather conditions, and other factors. Also the possibility exists for the components to become frozen together because of moisture trapped therein during subfreezing temperatures. Further, in normal usage these devices often require some movement of internal components for a pressure release to occur. Also, these types of valves tend to be fairly complicated and quite expensive.

Another approach to this problem is disclosed in U.S. Pat. No. 4,007,759, for Pressure Stabilizer For Storage Facilities and assigned to Sun Oil Company of Pennsylvania. That invention utilizes a spherically shaped element placed above an aperture in such a manner as to allow normal inbreathing and outbreathing. In the event the pressure build up in the system is too great, the ball is lifted off the seat to allow additional outbreathing. The apparatus disclosed in that application is quite expensive to manufacture because of the requirement for a spherical relief element, and further would probably not meet certain Underwriters Laboratories requirements because of its mode of construction.

SUMMARY OF THE INVENTION

In accordance with a preferred embodiment, a pressure stabilizer device is disclosed which should be relatively simple to construct, should be reliable in all types of weather conditions, should be of a type which will not malfunction because of insects, etc., and should meet Underwriters Laboratories requirements for such a device. The preferred embodiment includes a pressure stabilizer device having a plate-like valve element which sits upon a valve seat. The plate-like valve element which is preferably cylindrical, but which may be of square or other cross-section, is spaced apart from the valve seat by a plurality of small spacer elements between the seat and the element which provides a predetermined open aperture area for the device. Additionally, the valve element has a central guide aperture which may be circular, square or other configuration through which a guide element extends, and the clearance between the aperture and guide element provides an additional predetermined open aperture area for the valve. The guide element may be of circular, square or other cross-section but will, of course, fit within the central guide aperture. The combination of both areas provides the total normal, open aperture for the valve. In the event the pressure in the underground storage facility becomes too great, the plate-like element will lift off the guide seat to provide a larger aperture. Also, the preferred embodiment provides such a valve enclosed within a cylindrical housing and having a screen element at the opening of the housing to prevent the entrance of insects and other foreign objects into the device.

BRIEF DESCRIPTION OF THE DRAWINGS

FIG. 1 is a cross-sectional view of a preferred embodiment of the pressure stabilizer device showing the essential interaction of the components.

FIG. 2 is a view showing only the external shield along lines 2—2 or FIG. 1 and shows certain details of the housing shield.

FIG. 3 is a view along lines 3—3 of FIG. 1 and shows the relationship of the guide element to the guide hole within the restrictive device.

FIG. 4 is a view as in FIG. 3 along lines 3—3 of FIG. 1, with a guide element of different cross-section.

DESCRIPTION OF A PREFERRED EMBODIMENT

FIG. 1 is a vertical cross-sectional view of the pressure stabilizer. The device includes a main housing 10 which may have several threaded holes 12 therein for set screws to securely attach it to a vent line. The housing 10 includes an upper section having a large internal diameter and a lower section with a smaller internal diameter, which results in the formation of a shoulder 14 where the two sections meet. An annular shaped valve seat 16 is positioned on that shoulder.

A cylindrically shaped valve element 18 rests on the valve seat, and is separated slightly therefrom by four stainless steel rivets 20 in the element which are equally spaced around its bottom outside periphery. The rivets are provided to minimize the possibility of the valve element freezing to the valve seat, as might occur if the element were positioned flat against the seat. As best seen in FIG. 3, the valve element 18 includes a circular hole 22 at its center, in which a square guide 24 is positioned. FIG. 4 illustrates a guide element 24' which is circular in cross-section. The guide element 24 serves the function of preventing the valve element from becoming cocked in the valve in the event the element is lifted off the seat. Immediately above the valve seat the housing includes four equally spaced round apertures 26 through which gases may flow. A shield 28 is positioned around the main housing 10, and has a funnel shaped piece of screen material 30 positioned in its top opening. The screen allows gases to flow therethrough while preventing insects and other foreign objects from entering the device. The shield 28 has a cross-section as indicated in FIG. 2, and includes a plurality of indentations 29 around its bottom, which allow draining of any precipitation which may enter the valve housing. A truncated cone shaped deflector 32 is positioned above the screen, and deflects outbreathed vapors up and away from the restrictive device. The deflector also prevents precipitation, dust, etc., from directly entering the restrictive device through the screen 30. The housing further includes a top portion 34 which is mounted on and secured to the main housing member 10. The top portion 34 has a centrally located hole through which a screw 36 extends. The screw 36 holds the deflector 32, screen 30, and guide element 24 in position in the device.

In normal operation of the system, the valve element 18 rests on the seat 16, and is separated therefrom by the heads of the rivets 20. This provides a first gas flow path having an effective area of the internal diameter of the valve seat times the height of the rivet heads and a second gas flow path of the difference in area between the hole 22 and the guide element 24. In one designed embodiment, the internal diameter of the valve seat 16 was chosen to be 2.0 inches, the height of the rivet heads were chosen to be 0.036 inches, the diameter of the hole 22 was 17/32 inches, the guide post was ⅜ inches square. This provided a total open aperture area of 0.307 square inches for normal inbreathing and outbreathing through the valve. In the event the pressure across the valve becomes to great, which in one embodiment was designed to be 2.5 psi above atmospheric pressure, the cylindrical element 18, which has a total weight of 9.5 ounces, would be forced upward by the pressure differential, thereby providing a larger aperture through which to allow pressure relief.

In the designed embodiment the valve seat 16, valve element 18 and valve guide 24 were all constructed of steel since these parts may rub against each other, while the rivets 20 were stainless steel. Most other elements of the device were aluminum, as aluminum is easily machined.

Although at least one embodiment of the present invention has been described, the teachings of this invention will suggest many other embodiments to those skilled in the art.

The invention claimed is:

1. A pressure stabilizer device designed to have a given open effective aperture to allow inbreathing and outbreathing of gases through it during normal operation without movement of internal parts and comprising:
   (a) a housing having a valve seat;
   (b) a plate-like valve element resting on said valve seat and being spaced apart therefrom by a plurality of spacer elements, whereby the spacer elements provide a first, open aperture area through the device between the valve seat and the plate-like valve element;
   (c) said plate-like valve element having a guide aperture centrally located therein;
   (d) a guide element affixed to the valve housing and extending through said aperture in said plate-like element to guide any movement of the plate-like element within the housing and to prevent it from being cocked therein, with the area between the guide aperture and the guide element providing a second open aperture through the device, and whereby said plate-like valve element will lift off the valve seat and be displaced up along said guide element to provide a larger first, open aperture area in the event the pressure across the valve becomes too great.

2. A device as set forth in claim 1 where the plate-like valve element is cylindrical.

3. A device as set forth in claim 1 and further including a shield positioned around and attached to the housing to prevent foreign objects from interfering with the operation of the device, said shield having an upward facing aperture, and a screen element provided across said upward facing aperture to prevent foreign objects from entering the device.

4. A device as set forth in claim 3 where the plate-like element is cylindrical and the guide element has a square cross-section.

5. A device as set forth in claim 3 where the plate-like element is cylindrical and the guide element has a circular cross-section.

6. A device as set forth in claim 3 and further including a deflector having the shape of an inverted cone positioned above said screen element to prevent precipitation from falling directly through the screen element, and further to deflect any outbreathed gas upward and away from the device.

7. A device as set forth in claim 6 wherein said shield has a plurality of indentations around its base where it is attached to the housing to allow for the draining of any precipitation which might enter the device.

8. A device as set forth in claim 7 wherein the aperture in said plate-like valve element has a circular shape.

9. A device as set forth in claim 8 wherein said spacer elements include a plurality of rivets equally spaced around the bottom outside periphery of the valve element.

* * * * *